(12) United States Patent
Morioka et al.

(10) Patent No.: US 10,547,391 B2
(45) Date of Patent: Jan. 28, 2020

(54) OPTICAL MODULE

(71) Applicant: Enplas Corporation, Saitama (JP)

(72) Inventors: Shimpei Morioka, Saitama (JP); Ayano Kon, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 174 days.

(21) Appl. No.: 15/548,235

(22) PCT Filed: Jan. 26, 2016

(86) PCT No.: PCT/JP2016/052209
§ 371 (c)(1),
(2) Date: Aug. 2, 2017

(87) PCT Pub. No.: WO2016/125636
PCT Pub. Date: Aug. 11, 2016

(65) Prior Publication Data
US 2018/0019824 A1 Jan. 18, 2018

(30) Foreign Application Priority Data
Feb. 2, 2015 (JP) ................... 2015-018350

(51) Int. Cl.
*H04B 10/69* (2013.01)
*H04B 10/25* (2013.01)

(52) U.S. Cl.
CPC ........... *H04B 10/69* (2013.01); *H04B 10/25* (2013.01)

(58) Field of Classification Search
CPC ....... G02B 6/42; G02B 6/4204; G02B 6/4214
See application file for complete search history.

(56) References Cited

U.S. PATENT DOCUMENTS

| 5,150,342 A * | 9/1992 | Nagahara | G11B 7/094 369/44.14 |
| 2003/0108285 A1* | 6/2003 | Mine | G02B 6/4246 385/36 |

(Continued)

FOREIGN PATENT DOCUMENTS

| CN | 104755977 A | 7/2015 |
| JP | 06-151973 A | 5/1994 |

(Continued)

OTHER PUBLICATIONS

International Search Report from International Application No. PCT/JP2016/052209 dated Mar. 29, 2016.

*Primary Examiner* — Thanh Luu
(74) *Attorney, Agent, or Firm* — Brundidge & Stanger, P.C.

(57) ABSTRACT

This optical module has a photoelectric conversion device including a light emitting element, and an optical receptacle for optically coupling an end face of an optical transmission body connected thereto and a light receiving face of a light receiving element. The optical receptacle includes a first optical face on which light emitted from the end face of the optical transmission body is incident, and a second optical face for emitting, toward the light receiving face of the light receiving element, the light incident on the first optical face. An irradiation spot of emitted light from the second optical face on a virtual plane including the light receiving face of the light receiving element is sufficiently large to encompass the entire light receiving face.

4 Claims, 5 Drawing Sheets

(56) References Cited

U.S. PATENT DOCUMENTS

2004/0202477 A1 10/2004 Nagasaka et al.
2014/0328558 A1 11/2014 Morioka et al.
2015/0010272 A1 1/2015 Tanazawa
2015/0234135 A1 8/2015 Kanke et al.

FOREIGN PATENT DOCUMENTS

| JP | 2003-152199 A | 5/2003 |
| JP | 2004-246279 A | 9/2004 |
| JP | 2013-137507 A | 7/2013 |
| JP | 2015-014748 A | 1/2015 |

* cited by examiner

OPTICAL MODULE

TECHNICAL FIELD

The present invention relates to an optical receiver module to which an optical transmission member is to be connected.

BACKGROUND ART

In optical communications using an optical transmission member such as an optical fiber and an optical waveguide, an optical transmitter module including a light emitting element such as a surface-emitting laser (for example, a vertical cavity surface emitting laser (VCSEL)), and an optical receiver module including a light receiving element such as a photodetector (for example, photodiode) have traditionally been used. The optical transmitter module includes an optical receptacle which allows light containing communication information emitted from the light emitting element to be incident on an end surface of the optical transmission member. In the meanwhile, the optical receiver module allows light containing communication information emitted from the optical transmission member to be incident on a light receiving surface of the light receiving element.

For example, PTL 1 discloses an optical transmitter module including a photoelectric conversion device in which a light emitting element and a detecting element are disposed, and an optical receptacle that optically connects the light emitting element to an end surface of an optical transmission member.

The optical module disclosed in PTL 1 includes the photoelectric conversion device and the optical receptacle. The photoelectric conversion device includes the light emitting element and the detecting element fixed on a substrate by wire bonding using a wire. The optical receptacle includes a first optical surface on which light emitted from the light emitting element is incident, a second optical surface which allows light traveling inside the optical receptacle to be emitted toward the end surface of the optical transmission member, a reflective surface which reflects light incident on the first optical surface toward the second optical surface, a light separation part which separates light reflected on the reflective surface into monitor light that advances toward the light receiving element and signal light that advances toward the end surface of the optical transmission member, and a third optical surface which allows the monitor light to be emitted toward the detecting element.

In the optical module disclosed in PTL 1, light emitted from the light emitting element and incident on the first optical surface is reflected on the reflective surface toward the light separation part. The light reflected on the reflective surface is separated into the signal light and the monitor light by the light separation part. The signal light separated at the light separation part is emitted from the second optical surface toward the end surface of the optical transmission member. In the meantime, the monitor light separated at the light separation part is emitted from the third optical surface toward a light receiving surface of the detecting element.

CITATION LIST

Patent Literature

PTL 1
Japanese Patent Application Laid-Open No. 2013-137507

SUMMARY OF THE INVENTION

Technical Problem

It is conceivable to use an optical module disclosed in PTL 1 as an optical receiver module. By way of example, the optical module disclosed in PTL 1 can be used as an optical receiver module by replacing all of its light emitting elements with light receiving elements such as photodetectors.

In recent years, in optical receiver modules, the area of a light receiving surface of a light receiving element has been reduced because of an increase in transmission rate. In optical receiver modules for high-speed communication, an irradiation spot of reception light on the light receiving surface of the light receiving element is made smaller than the area of the light receiving surface of the light receiving element, so that all the reception light is allowed to be received by the light receiving element. In addition, the irradiation spot of reception light on the light receiving surface is made still smaller than the area of the light receiving surface, so that a tolerance width allowing assembly errors in a manufacturing process of the optical module is secured.

Making the irradiation spot of reception light on the light receiving surface smaller, however, requires accurate formation of a first and a second optical surfaces. In addition, high accuracy is also required during assembly of the optical module, so that the manufacturing cost of the optical module increases.

Making the irradiation spot of reception light on the light receiving surface smaller also requires an increase in magnification $\beta$ of the optical receptacle. "Magnification $\beta$ of the optical receptacle" can here be represented by the following equation 1 in a case where light traveling inside the optical receptacle is collimated light:

$$\beta = D1/D2 \qquad \text{(Equation 1)}$$

wherein D1 denotes the distance between an end surface of the optical transmission member and the second optical surface, and D2 denotes the distance between the first optical surface and the light receiving surface of the light receiving element.

Distance D1 between the end surface of the optical transmission member and the second optical surface is standardized. Accordingly, distance D2 between the first optical surface and the light receiving surface of the light receiving element needs to be reduced in order to increase magnification $\beta$ of the optical receptacle according to the aforementioned equation 1. An excessive reduction in distance D2 between the first optical surface and the light receiving surface of the light receiving element, however, causes interference between the first optical surface and a wire which fixes the light receiving element.

In this way, an increase in magnification $\beta$ of the optical receptacle causes interference between the first optical surface and the wire, and therefore the irradiation spot of reception light on the light receiving surface cannot be made smaller than a predetermined size. This unfavorably reduces a tolerance width of the irradiation spot of reception light with respect to the light receiving surface.

An object of the present invention is thus to provide an optical module which is inexpensive and has a large tolerance width.

Solutions to Problems

An optical module according to the present invention includes a photoelectric conversion device including one or more light-receiving elements, and an optical receptacle to which one or more optical transmission members are to be connected, the optical transmission member being configured to optically couple an end surface of the optical transmission member with a light receiving surface of the light receiving element, in which: the optical receptacle includes one or more first optical surfaces on which light emitted from the end surface of the optical transmission member is incident, and one or more second optical surfaces which allows light incident on the first optical surface to be emitted toward the light receiving surface of the light receiving element; and an irradiation spot of light from the second optical surface is large enough to entirely encompass the light receiving surface, the irradiation spot being on a virtual plane including the light receiving surface of the light receiving element.

Advantageous Effects of Invention

According to the present invention, an optical module which is inexpensive and has a large tolerance width can be provided.

DESCRIPTION OF EMBODIMENTS

Hereinafter, an embodiment of the present invention will be described in detail with reference to the accompanying drawings.

(Configuration of Optical Module)

Figure 1:
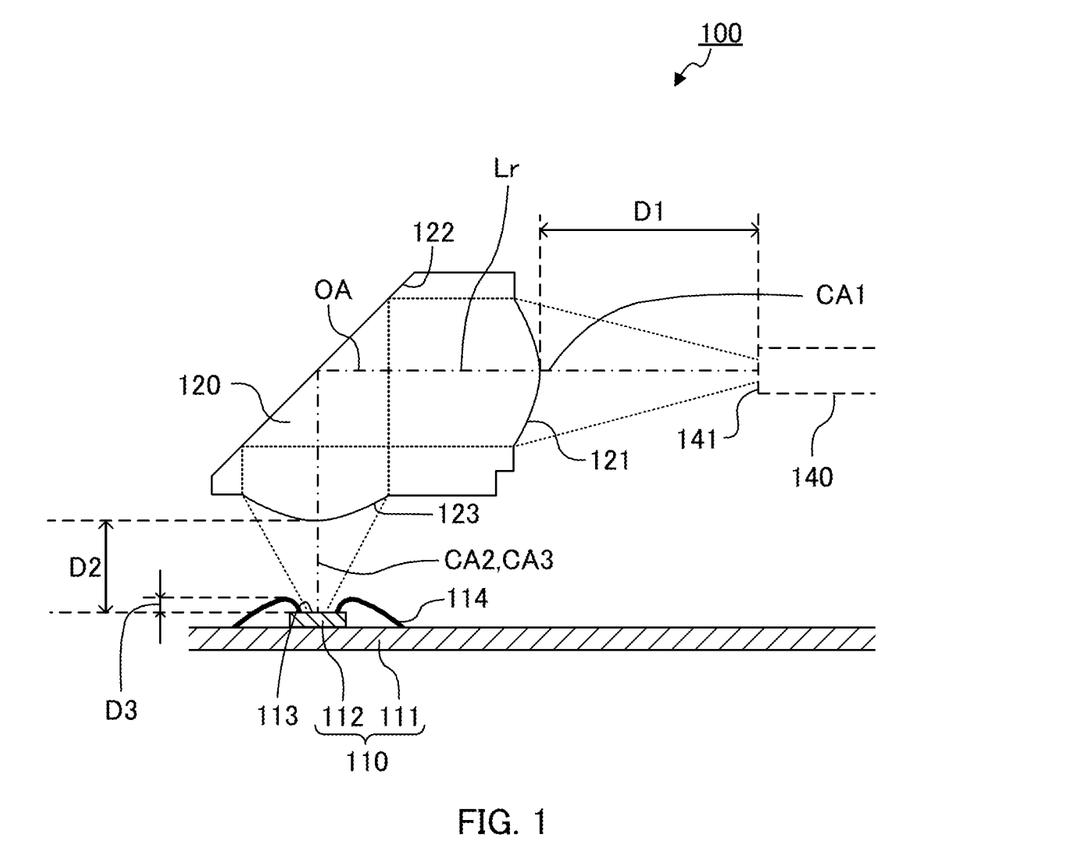
FIG. 1 is a sectional view of an optical module according to one embodiment of the present invention.

FIG. 1 is a sectional view of optical module 100 according to one embodiment of the present invention. It is to be noted that hatching in a section of optical receptacle 120 is omitted in FIG. 1 to illustrate an optical path inside optical receptacle 120. In addition, a long dashed dotted line illustrates optical axis OA of reception light Lr, and a dotted line illustrates the external shape of reception light Lr.

As illustrated in FIG. 1, optical module 100 includes photoelectric conversion device 110 of a substrate mounting type including a photoelectric conversion element (light receiving element 112), and optical receptacle 120. Optical module 100 is used in a state where optical transmission member 140 is connected to optical receptacle 120 via a ferrule.

The type of optical transmission member 140 is not particularly limited. Examples of optical transmission member 140 include an optical fiber, optical waveguide, and the like. In the present embodiment, optical transmission member 140 is an optical fiber. The optical fiber may be a single-mode optical fiber or a multi-mode optical fiber. The number of optical transmission members 140 is not particularly limited. In the present embodiment, the number of optical transmission members 140 is one. It is to be noted that, when a plurality of optical transmission members 140 is used, the plurality of optical transmission members 140 may be disposed in one line or in two or more lines.

Photoelectric conversion device 110 includes substrate 111 and light receiving element 112.

Substrate 111 is, for example, a glass composite substrate, glass epoxy substrate, flexible substrate, or the like.

Light receiving element 112 is disposed on substrate 111 and receives reception light Lr emitted from optical transmission member 140. Light receiving element 112 is a photodiode, for example. Light receiving element 112 is fixed on substrate 111 by wire bonding using wire 114. The number of light receiving elements 112 is not particularly limited. In the present embodiment, the number of light receiving elements 112 is one. It is to be noted that, when a plurality of optical transmission members 140 is disposed in one line, the same number of light receiving elements 112 as optical transmission members 140 may also be disposed in one line. In addition, when optical transmission members 140 are disposed in two or more lines, the number of lines of light receiving elements 112 may also be identical to that of optical transmission members 140.

Optical receptacle 120 is disposed on substrate 111. Optical receptacle 120 optically couples light receiving surface 113 of light emitting element 112 with end surface 141 of optical transmission member 140 in a state where optical receptacle 120 is disposed between photoelectric conversion device 110 and optical transmission member 140.

(Configuration of Optical Receptacle)

As illustrated in FIG. 1, optical receptacle 120 includes first optical surface 121, reflective surface 122, and second optical surface 123. Optical receptacle 120 has light transmissivity, and allows reception light Lr emitted from end surface 141 of optical transmission member 140 to be emitted toward light receiving surface 113 of light receiving element 112. Optical receptacle 120 is formed of a material that transmits light having the wavelength used in optical communications. Examples of such a material include transparent resins such as polyetherimide (PEI) and cyclic olefin resin. In addition, optical receptacle 120 is manufactured, for example, by injection molding.

First optical surface 121 is an optical surface which allows reception light Lr emitted from optical transmission member 140 to enter optical receptacle 120 while refracting the light. In the present embodiment, first optical surface 121 has a shape of a convex lens protruding toward optical transmission member 140. First optical surface 121 converts reception light Lr emitted from optical transmission member 140 into collimated light. In addition, in the present embodiment, first optical surface 121 is disposed on the front surface of optical receptacle 120 in such a manner as to face end surface 141 of optical transmission member 140. In addition, first optical surface 121 has a circular shape in plan view. It is preferable that central axis CA1 of first optical surface 121 be perpendicular to end surface 141 of optical transmission member 140. In addition, it is preferable that central axis CA1 of first optical surface 121 coincide with optical axis OA of reception light Lr emitted from optical transmission member 140. The number of first optical surfaces 121 is not particularly limited. In the present embodiment, the number of first optical surfaces 121 is one. It is to be noted that, when a plurality of optical transmission members 140 is disposed in one line, the same number of first optical surfaces 121 as optical transmission members 140 may also be disposed in one line. In addition, when optical transmission members 140 are disposed in two or more lines, the number of lines of first optical surfaces 121 may be identical to that of optical transmission members 140.

Reflective surface 122 is an optical surface which reflects reception light Lr incident on first optical surface 121 toward second optical surface 123. In the present embodiment, reflective surface 122 is disposed on the top surface side of optical receptacle 120, and is inclined such that the distance to optical transmission member 140 increases from the top surface toward the bottom surface of optical receptacle 120. In the present embodiment, reflective surface 122 has a planar shape. The inclination angle of reflective surface 122 is not particularly limited as long as reflective surface 122 can reflect reception light Lr incident on first optical surface 121 toward the second optical surface. In the present embodiment, the inclination angle of reflective surface 122 relative to optical axis OA of reception light Lr incident on first optical surface 121 is 45 degrees.

Second optical surface 123 is an optical surface which allows reception light Lr incident on first optical surface 121 and reflected on reflective surface 122 to be emitted toward light receiving surface 113 of light receiving element 112. In the present embodiment, second optical surface 123 has a shape of a convex lens protruding toward light receiving surface 113 of light receiving element 112. Second optical surface 123 converges, onto light receiving surface 113 of light receiving element 112, light that travels inside optical receptacle 120. In addition, in the present embodiment, second optical surface 123 is disposed on the bottom surface of optical receptacle 120 in such a manner as to face end surface 141 of light receiving element 112. In addition, second optical surface 123 has a circular shape in plan view. In the meantime, the angle formed by central axis CA2 of second optical surface 123 and central axis CA3 of light receiving surface 113 of light receiving element 112 is not particularly limited. In the present embodiment, central axis CA2 of second optical surface 123 is oriented perpendicular to end surface 141 of light receiving element 112. The number of second optical surfaces 123 is not particularly limited. In the present embodiment, the number of second optical surfaces 123 is one. It is to be noted that, when a plurality of optical transmission members 140 is disposed in one line, the same number of second optical surfaces 123 as optical transmission members 140 may also be disposed in one line. In addition, when optical transmission members 140 are disposed in two or more lines, the number of lines of second optical surfaces 123 may be identical to that of optical transmission members 140.

With optical receptacle 120 according to the present embodiment, irradiation spot S of reception light Lr emitted from second optical surface 123 on a virtual plane including light receiving surface 113 of light receiving element 112 is large enough to entirely encompass light receiving surface 113. This increases a tolerance width, as will be described in detail later. It is preferable that the ratio ($\beta$=D1/D2) of distance D1 between the end surface and the first optical surface to distance D2 between second optical surface 123 and light receiving surface 113 be less than 1.56 in order for irradiation spot S of reception light Lr on the virtual plane including light receiving surface 113 to entirely encompass light receiving surface 113. When predetermined magnification $\beta$ of optical receptacle 120 is 1.56 or greater, distance D2 between second optical surface 123 and light receiving surface 113 is less than 200 μm, and in this case there is a risk of interference between second optical surface 123 and wire 114. In the meantime, it is preferable that the ratio ($\beta$=D1/D2) of distance D1 between the end surface and the first optical surface to distance D2 between second optical surface 123 and light receiving surface 113 be greater than 1.0. When magnification $\beta$ of optical receptacle 120 is 1.0 or less, the maximum coupling efficiency is reduced, and in this case it is impossible to exhibit desired performance.

(Simulation)

To begin with, the relationship between magnification $\beta$ of optical receptacle 120 and the distance from second optical surface 123 to light receiving surface 113 of light receiving element 112 was simulated. As described above, magnification $\beta$ of the optical receptacle can here be represented by the following equation 1 in a case where light traveling inside optical receptacle 120 is collimated light:

$$\beta = D1/D2 \tag{Equation 1}$$

wherein D1 denotes the distance between end surface 141 of optical transmission member 140 and first optical surface 121, and D2 denotes the distance between second optical surface 123 and light receiving surface 113 of light receiving element 112 (see FIG. 1).

As described above, in photoelectric conversion device 110 of optical module 100, light receiving element 112 is fixed on substrate 111 by wire bonding. In this simulation, the distance between end surface 141 of optical transmission member 140 and first optical surface 121 was 350 μm, the diameter φ1 of core of optical transmission member (optical fiber) (hereinafter also simply referred to as "core diameter") was 50 μm, the numerical aperture (NA) of first optical surface 121 was 0.2, and the intensity distribution of reception light Lr to be emitted from end surface 141 of optical transmission member 140 was a Gaussian distribution. In addition, the shape of light receiving surface 113 of light receiving element 112 in plan view was a circle, and the diameter φ2 of light receiving surface 113 in plan view was 32 μm.

In addition, in this simulation, magnification $\beta$ of the optical receptacle was 1.0, 1.19, 1.56, 2.27, or 2.50. Distance D2 between second optical surface 123 and light receiving surface 113 of light receiving element 112 was calculated using the aforementioned equation 1 (see Table 1).

In general, when light receiving element 112 is fixed on substrate 111 by wire bonding, distance D3 between the position of wire 114 that is most distant from substrate 111 (the top of wire 114) and light receiving surface 113 of light receiving element 112 along the direction of the normal to the surface of substrate 111 (maximum height of wire 114 from light receiving surface 113; see FIG. 1) is approximately between 150 μm and 200 μm. In this respect, distance D2 (see FIG. 1) between light receiving surface 113 of light receiving element 112 and second optical surface 123 needs to be approximately between 200 μm and 250 μm in order to prevent interference between second optical surface 123 and wire 114 during assembly of optical module 100. As indicated in Table 1, when magnification $\beta$ of the optical receptacle is less than 1.56, distance D2 between second optical surface 123 and light receiving surface 113 of light receiving element 112 is greater than 200 μm. Accordingly, when magnification $\beta$ of the optical receptacle is less than 1.56, traditional wire bonding can be used to fix light receiving element 112 on substrate 111, and second optical surface 123 and light receiving surface 113 of light receiving element 112 do not interfere with each other in assembled optical module 100.

Next, diameter φ3 of irradiation spot S was calculated for each magnification β of optical receptacle 120 (see Table 1). In this respect, diameter φ3 of irradiation spot S can be represented by the following equation 2:

Diameter φ3 of irradiation spot S(μm)=Core diameter φ1/Magnification β of optical receptacle  (Equation 2).

The aforementioned equation 2 is here expressed in the following equation 3 since core diameter φ1 is 50 μm as mentioned above:

Diameter φ3 of irradiation spot S=50 (μm)/Magnification β of optical receptacle  (Equation 3).

As indicated in Table 1, when magnification β of optical receptacle 120 is greater than 1.56, diameter φ3 of irradiation spot S is less than diameter φ2 (32 μm) of the light receiving surface, and accordingly irradiation spot S can be entirely encompassed by light receiving surface 113. It is understood, in this way, that when optical receptacle 120 is disposed at a suitable position, all reception light Lr emitted from optical transmission member 140 can be received by light receiving surface 113 of light receiving element 112.

From the above, magnification β of optical receptacle 120 of less than 1.56 is preferable in consideration of interference between second optical surface 123 and the wire. In the meantime, magnification β of optical receptacle 120 of greater than 1.56 is preferable in consideration of the relationship between diameter φ2 of light receiving surface 113 and diameter φ3 of irradiation spot S. In this way, in the conventional art, requirements could not be met for magnification β of optical receptacle 120 and for the relationship between diameter φ2 of light receiving surface 113 and diameter φ3 of irradiation spot S. The inventors of the present invention then paid attention to the coupling efficiency of reception light Lr and the tolerance width during assembly, and considered to positively make diameter φ3 of irradiation spot S larger than diameter φ2 of the light receiving surface.

Figure 2:
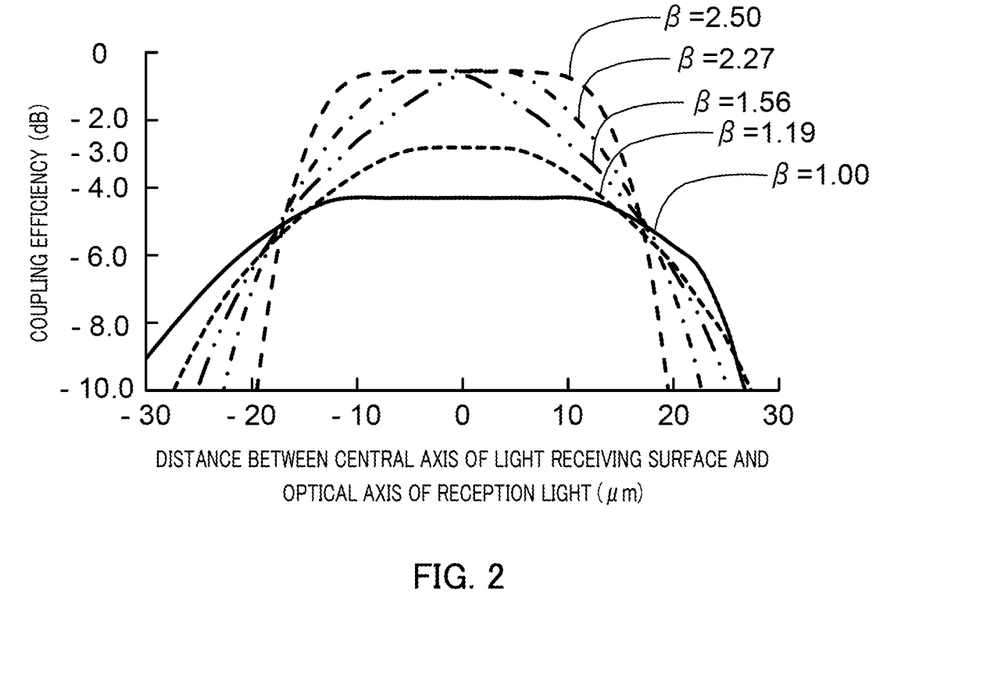
FIG. 2 is a graph showing a relationship between the distance from an optical axis of reception light to a central axis of a light receiving surface and a coupling efficiency.

The inventors simulated the relationship between the coupling efficiency and the distance between optical axis OA of reception light Lr emitted from second optical surface 123 and central axis CA3 of light receiving surface 113. FIG. 2 is a graph showing the relationship between the coupling efficiency and the distance from optical axis OA of reception light Lr to central axis CA3 of the light receiving surface. In FIG. 2, the abscissa indicates the distance (μm) between optical axis OA of reception light Lr and central axis CA3 of the light receiving surface, and the ordinate indicates the coupling efficiency (dB). In FIG. 2, the solid line indicates a result obtained using optical receptacle 120 having magnification β of 1.0, the dotted line indicates a result obtained using an optical receptacle having magnification β of 1.19, the long dashed double-dotted line indicates a result obtained using optical receptacle 120 having magnification β of 1.56, the long dashed dotted line indicates a result obtained using optical receptacle 120 having magnification β of 2.27, and the broken line indicates a result obtained using an optical receptacle having magnification β of 2.5.

Figure 3A:
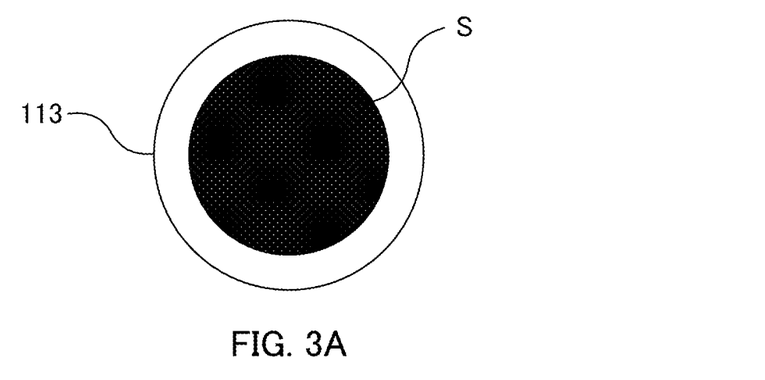
FIGS. 3A to 3C illustrate positional relationships between a light receiving surface of a light receiving element and an irradiation spot.
Figure 3B:
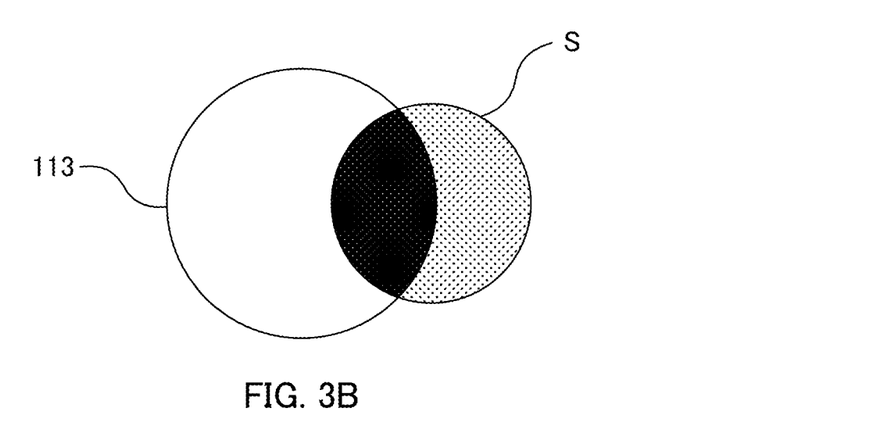
Figure 3C:
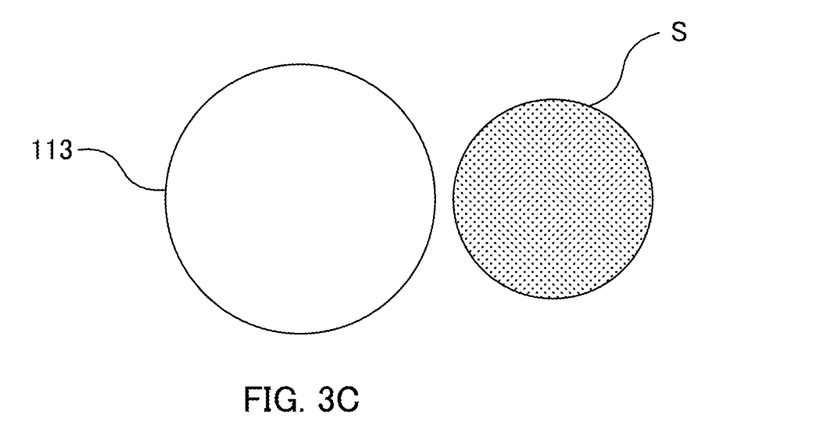
Figure 4A:
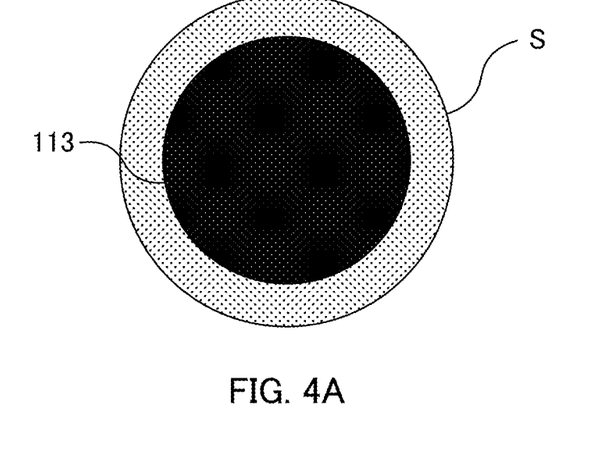
FIGS. 4A to 4C illustrate positional relationships between the light receiving surface of the light receiving element and an irradiation spot.
Figure 4B:
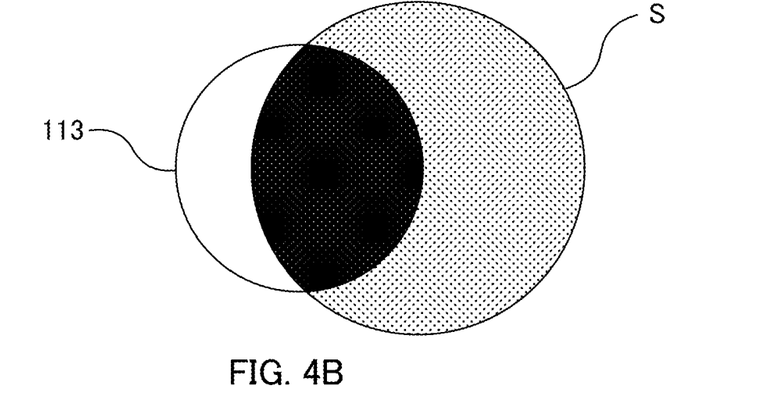
Figure 4C:
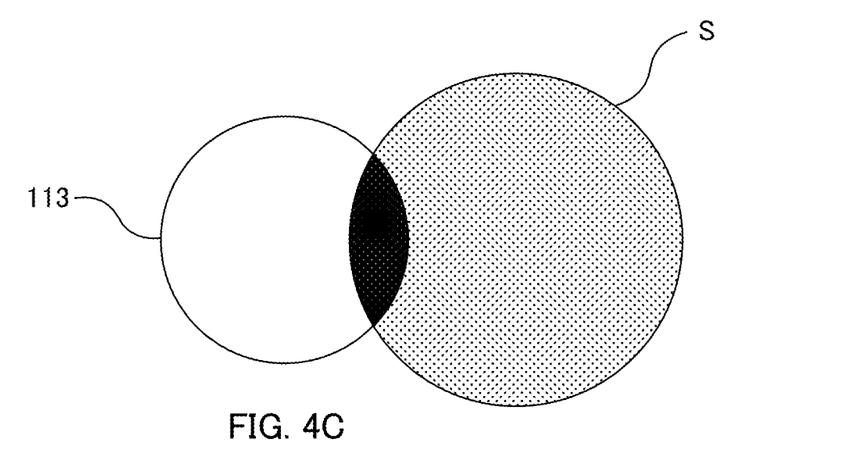

FIGS. 3A to 3C and 4A to 4C illustrate positional relationships between light receiving surface 113 of light receiving element 112 and irradiation spot S. FIGS. 3A to 3C illustrate the positional relationships between light receiving surface 113 of light receiving element 112 and irradiation spot S in a case where diameter φ3 of irradiation spot S is smaller than diameter φ2 of light receiving surface 113. FIGS. 4A to 4C illustrate the positional relationships between light receiving surface 113 of light receiving element 112 and irradiation spot S in a case where diameter φ3 of irradiation spot S is greater than diameter φ2 of light receiving surface 113.

As shown in FIGS. 2 and 3A to 3C, it was found that the maximum coupling efficiency increases with increasing magnification β of optical receptacle 120 (with decreasing diameter φ3 of irradiation spot S relative to diameter φ2 of light receiving surface 113).

As shown in FIGS. 2 and 3A to 3C, it was also found that as magnification β of optical receptacle 120 increases, the maximum coupling efficiency increases, but a decrease in coupling efficiency of when the central axis of light receiving surface 113 and optical axis OA of reception light Lr are away from each other is greater.

As shown in FIGS. 2 and 4A to 4C, it was found that as magnification β of optical receptacle 120 decreases, the maximum coupling efficiency decreases, but a decrease in coupling efficiency of when the central axis of light receiving surface 113 and optical axis OA of reception light Lr are away from each other is smaller. In other words, the above findings indicate that, if the maximum coupling efficiency is permissible, optical module 100 in which irradiation spot S is larger than light receiving surface 113 of light receiving element 112 appropriately functions even when central axis CA3 of light receiving surface 113 and optical axis OA of reception light Lr are away from each other. This indicates that the tolerance width during assembly of optical module 100 is large.

TABLE 1

| Magnification β | | 1.0 | 1.19 | 1.56 | 2.27 | 2.50 |
|---|---|---|---|---|---|---|
| D2 (μm) | | 350 | 290 | 220 | 150 | 140 |
| φ3 (μm) | | 50 | 42 | 32 | 22 | 20 |
| Tolerance width (μm) | −1 dB | 35 | 20 | 10 | 15 | 25 |
|  | −2 dB | 40 | 30 | 20 | 25 | 25 |
|  | −3 dB | 45 | 35 | 25 | 25 | 30 |
| Maximum coupling efficiency (dB) | | −4.3 | −2.8 | −0.7 | −0.6 | −0.6 |
| Compatibility evaluation | | Fair | Good | Good | Fair | Poor |

Figure 5A:
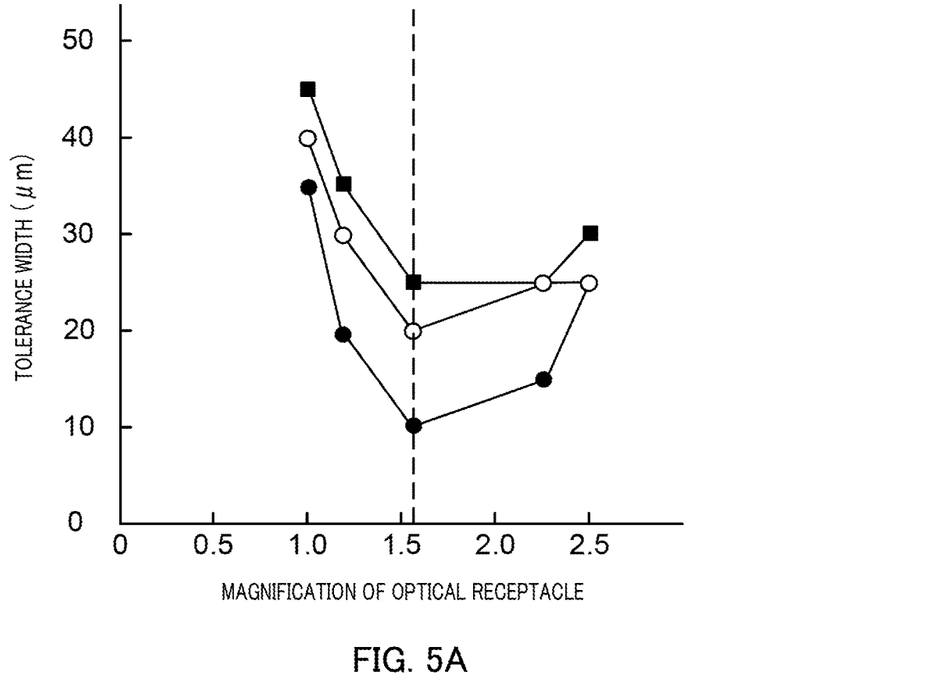
FIG. 5A is a graph showing a relationship between the magnification of an optical receptacle and the tolerance width.
Figure 5B:
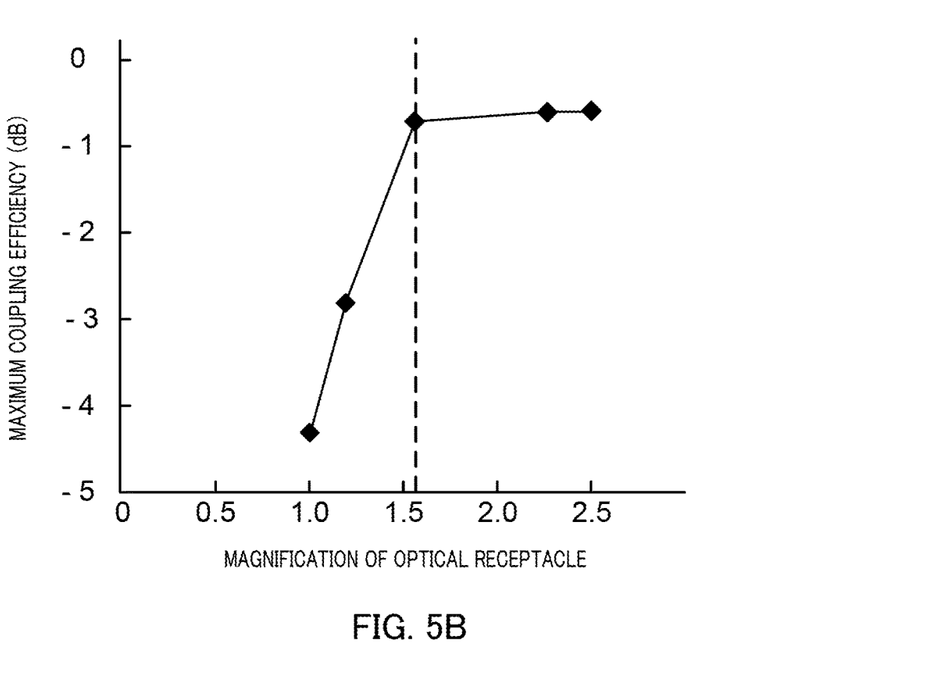
FIG. 5B is a graph showing a relationship between the magnification of the optical receptacle and the maximum coupling efficiency.

FIG. 5A is a graph showing a relationship between the magnification of optical receptacle 120 and the tolerance width, and FIG. 5B is a graph showing a relationship between the magnification of optical receptacle 120 and the maximum coupling efficiency. In FIGS. 5A and 5B, the abscissas indicate the magnification of optical receptacle 120. The ordinate in FIG. 5A indicates the distance between the central axis of light receiving surface 113 and optical axis OA of reception light Lr (tolerance width; μm) within which a certain coupling efficiency can be maintained, and the ordinate in FIG. 5B indicates the maximum coupling efficiency (dB). In FIG. 5A, the symbol of a filled circle indicates the distance between the central axis of light receiving surface 113 and optical axis OA of reception light Lr within which a maximum coupling efficiency of −1 dB can be maintained, the symbol of an open circle indicates the distance between the central axis of light receiving surface 113 and optical axis OA of reception light Lr within which a maximum coupling efficiency of −2 dB can be maintained, and the symbol of a filled square indicates the distance between the central axis of light receiving surface 113 and optical axis OA of reception light Lr within which a maximum coupling efficiency of −3 dB can be maintained.

The magnification of optical receptacle 120 used in optical module 100 can be determined with reference to FIGS. 5A and 5B. The magnification of optical receptacle 120 may be determined in accordance with balance between the required maximum coupling efficiency and the permissible tolerance width. In the present embodiment, the magnification of optical receptacle 120 was less than 1.56 in consideration of the assembly of optical module 100 (see Table 1). In addition, the magnification of optical receptacle 120 was greater than 1.0 in consideration of the maximum coupling efficiency. In this case, the tolerance width in a case of "a maximum coupling efficiency of −3 (dB)" is greater than 25 µm and less than 45 µm, and accordingly assembling optical module 100 is also easy.

(Effect)

As described above, a tolerance width can be increased in optical module 100 according to the present embodiment since irradiation spot S of emitted light from second optical surface 123 on the virtual plane including light receiving surface 113 of light receiving element 112 is large enough to entirely encompass light receiving surface 113. This makes it possible both to easily assemble optical module 100 and to maintain its product performance even when optical axis OA of reception light Lr and central axis CA3 of light receiving surface 113 are misaligned with each other during the assembling process of optical module 100. In addition, optical receptacle 120 according to the present embodiment does not require accuracy more than traditional products do, and can thus be produced inexpensively.

It is to be noted that, although the present embodiment has been described in connection with optical receptacle 120 which does not have a reflective film on reflective surface 122, the reflective film such as a thin film formed of a metal having a high light reflectance (such as Al, Ag, and Au) may be formed on reflective surface 122. When reduction of the number of components is prioritized, it is preferable to employ a configuration using only a total reflection surface.

This application claims priority based on Japanese patent Application No. 2015-018350, filed on Feb. 2, 2015, the entire contents of which including the specification and the drawings are incorporated herein by reference.

INDUSTRIAL APPLICABILITY

The optical module according to the present invention is useful, for example, for optical communications using an optical transmission member.

REFERENCE SIGNS LIST

100 Optical module
110 Photoelectric conversion device
111 Substrate
112 Light receiving element
113 Light receiving surface
120 Optical receptacle
121 First optical surface
122 Reflective surface
123 Second optical surface
140 Optical transmission member
141 End surface
Lr Reception light

The invention claimed is:

1. An optical module comprising:
   a photoelectric conversion device including one or more light receiving elements; and
   an optical receptacle to which one or more optical transmission members are to be connected, the optical receptacle being configured to optically couple an end surface of an optical transmission member of the one or more optical transmission members with a light receiving surface of a light receiving element of the one or more light receiving elements, wherein:
   the optical receptacle includes:
      one or more first optical surfaces on which light emitted from the end surface of the optical transmission member is incident, and
      one or more second optical surfaces which allow light incident on a first optical surface of the one or more first optical surfaces to be emitted toward the light receiving surface of the light receiving element,
   a ratio of a size of an irradiation spot of light from a second optical surface of the one or more second optical surfaces on a virtual plane including the light receiving surface of the light receiving element, to a size of the light receiving surface is greater than 1.0 and less than 1.56, and
   a ratio (D1/D2) of a distance D1 between the end surface and the first optical surface to a distance D2 between the second optical surface and the light receiving surface is greater than 1.0.

2. The optical module according to claim 1, wherein:
   the ratio (D1/D2) of the distance D1 between the end surface and the first optical surface to the distance D2 between the second optical surface and the light receiving surface is less than 1.56.

3. The optical module according to claim 2, wherein:
   the optical receptacle further includes a reflective surface disposed between the first optical surface and the second optical surface, the reflective surface being configured to reflect light incident on the first optical surface toward the second optical surface.

4. The optical module according to claim 1, wherein:
   the optical receptacle further includes a reflective surface disposed between the first optical surface and the second optical surface, the reflective surface being configured to reflect light incident on the first optical surface toward the second optical surface.

* * * * *